Figure 8:
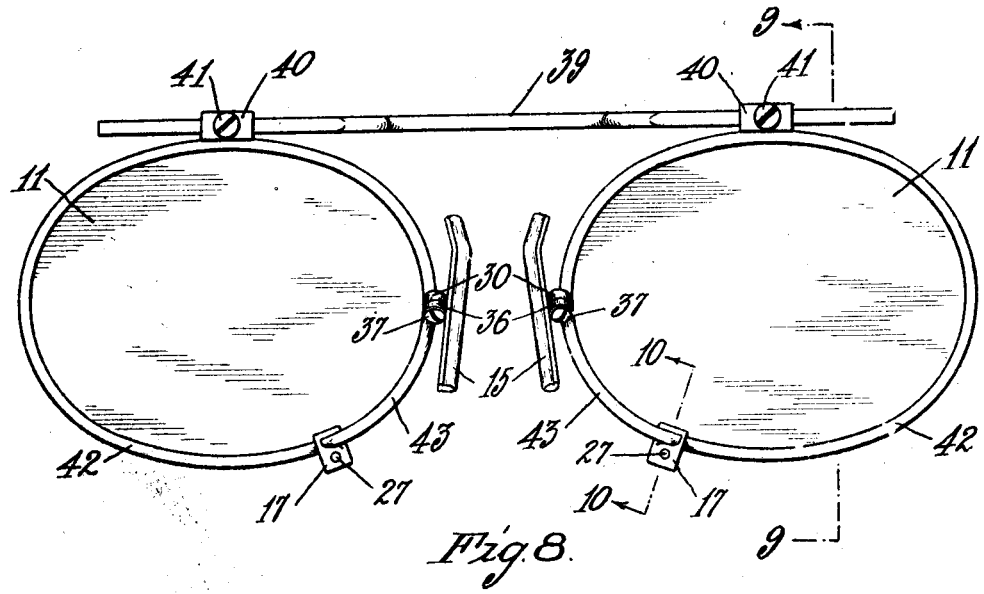

S. J. CLULEE.
EYEGLASSES AND SPECTACLES.
APPLICATION FILED MAR. 16, 1916.
1,196,083.
Patented Aug. 29, 1916.
2 SHEETS—SHEET 1.
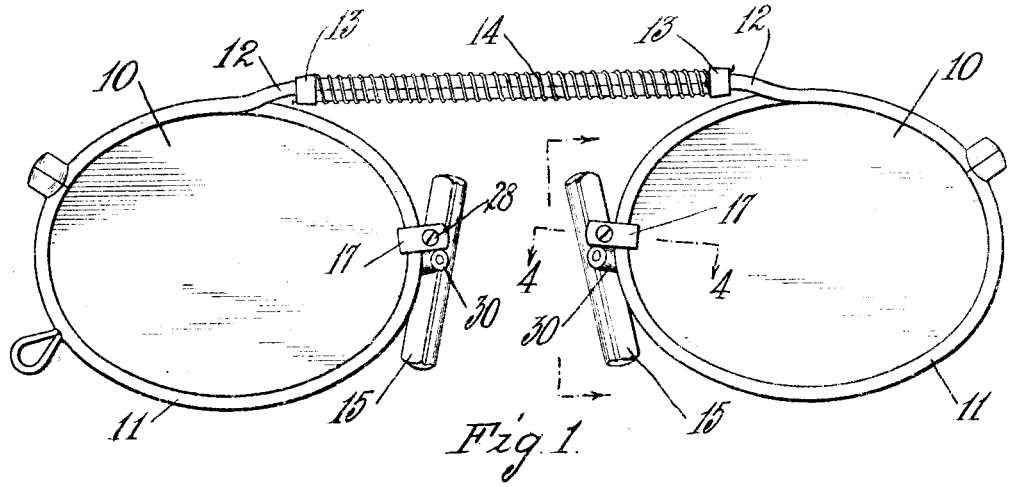
Fig. 1.
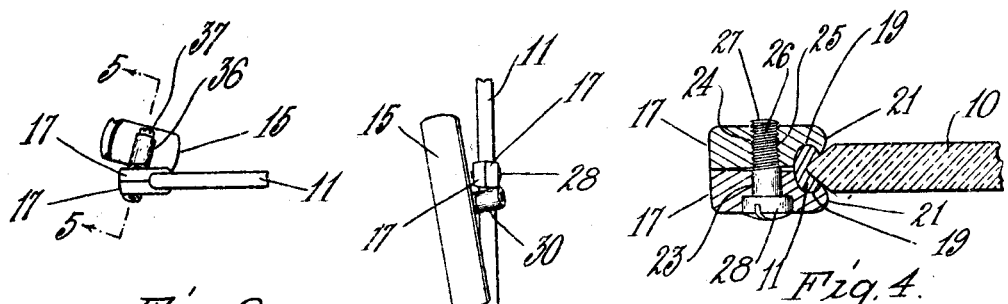 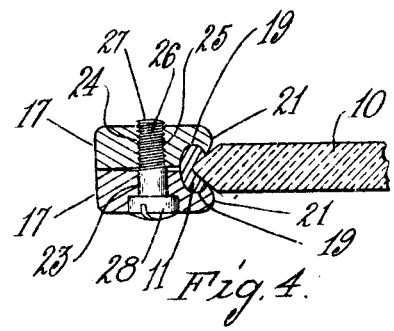
Fig. 2. Fig. 3. Fig. 4.
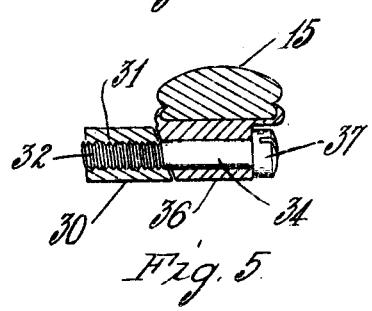 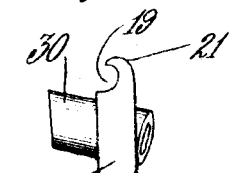 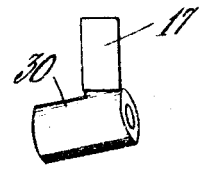
Fig. 5. Fig. 6. Fig. 7.
Inventor
Stephen J. Clulee
By Horatio E. Bellows
Attorney

S. J. CLULEE.
EYEGLASSES AND SPECTACLES.
APPLICATION FILED MAR. 16, 1916.

1,196,083.

Patented Aug. 29, 1916
2 SHEETS—SHEET 2.

Inventor.
Stephen J. Clulee
By Horatio E. Bellows
Attorney.

UNITED STATES PATENT OFFICE.

STEPHEN J. CLULEE, OF ATTLEBORO, MASSACHUSETTS.

EYEGLASSES AND SPECTACLES.

1,196,083.   Specification of Letters Patent.   Patented Aug. 29, 1916.

Application filed March 16, 1916. Serial No. 84,660.

*To all whom it may concern:*

Be it known that I, STEPHEN J. CLULEE, a citizen of the United States, residing at Attleboro, in the county of Bristol and State of Massachusetts, have invented certain new and useful Improvements in Eyeglasses and Spectacles, of which the following is a specification.

My invention relates to the astigmatic type of eyeglasses and spectacles and has for its essential objects the provision of means for elevating or lowering the lenses relatively to the pupils of the eye for the purpose of accommodating the glasses either for reading purposes or for forward vision, and for other purposes; and to attain the desired ends in a structure easily operable, inexpensive, and adapted to embodiment in any form of guard.
To the above ends essentially my invention consists in such parts and combinations of parts as fall within the scope of the appended claims.

In the accompanying drawings which form a part of this specification, Figure 1 is a front elevation of a pair of astigmatic eyeglasses, Fig. 2, a plan of a nose guard, Fig. 3, a view of the same in the direction of the arrows in Fig. 1, Figs. 4 and 5, sections on lines 4—4 and 5—5 of Figs. 1 and 2 respectively. Figs. 6 and 7, detail views of one of the clamping blocks and its attached sleeve, Fig. 8, a rear elevation of an astigmatic eyeglass embodying a modified form of my invention, and Figs. 9 and 10, sections on lines 9—9 and 10—10 respectively of Fig. 8.

Like reference characters indicate like parts throughout the views.
In the drawings 10 are the lenses, 11 the straps, 12' the slidable bridge bars, 13 the guide straps, 14 the spring, and 15 the nose rests of a pair of astigmatic eyeglasses or spectacles.
In this type of article the nose rests are attached to the rims so as to be immovable thereon and have no capacity for elevating or lowering the lenses relatively to the pupils of the eye. In overcoming this defect I make the nose rests adjustable upon the rims.

My invention in its present form of embodiment, comprises clamps, each consisting in detail of two blocks 17 whose contiguous faces are provided at one end with vertically disposed grooves 19 opposite each other forming a seat for the rim and resultant inwardly directed fingers 21 gripping the latter. The blocks have transversely disposed openings 23 and 24 respectively in alinement with each other, the latter being provided with a thread 25 engaging the thread 26 of a screw shank 27 which passes also through the opening 23 and has its head 28 countersunk in the block. The described screw is turned to loosen the blocks and allow them to be slid along the rim to any desired position.

The nose rest is pivotally mounted upon the described clamp in any preferred manner. In this instance a rearwardly and downwardly inclined sleeve 30 is rigidly attached by solder or otherwise to the lower face of one of the blocks and has an internal thread 31 which engages the threaded portion 32 of a screw whose unthreaded portion 34 passes loosely through a sleeve 36 fixed to the back of the nose rest 15. The head 37 of the screw prevents the escape of the nose rest. This described form of pivot member is not exclusive, nor is the inclination of the sleeve 30 imperative.

Figure 9:
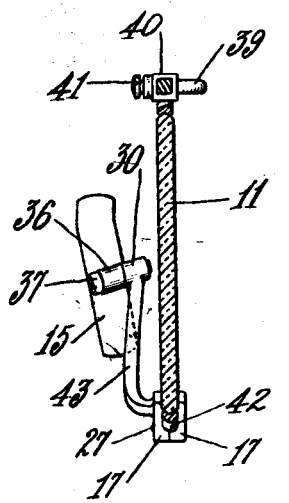
Figure 10:
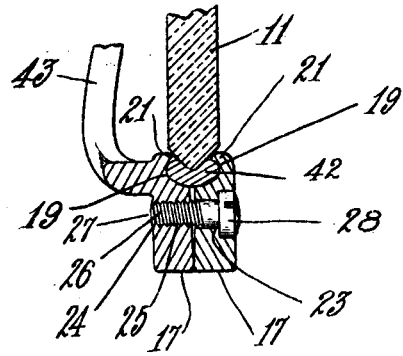

In Figs. 8, 9, and 10 is shown a modified form of my invention embodied in another form of astigmatic eyeglass wherein the rigid bridge bar 39 is an integral piece, upon which are blocks 40 longitudinally adjustable thereon by set screws 41.

The rims 42 are fixed to the blocks and carry the lenses 11. Integral with or fixed to one of the blocks 17 which are engaged with the lower inner portion of each rim, is an upwardly curved guard arm 43 carrying fixed to its upper end the sleeve 30 with its screw 37 upon which pivots the sleeve 36 of the nose rest 15. In this form of eyeglass by bending the arms 43 toward each other adjustment is secured to noses of different width, and by bending them toward and from the plane of the lenses the latter may be adjusted toward and from the eyes, but by no bending of the arms can vertical adjustment of the lenses be secured without the described adjusting device.

What I claim is:—

1. In eyeglasses or spectacles, the combination with the rim and the nose rest, of a clamping member attached to the exterior of the nose rest and engaging the rim, the nose-rest being pivotally mounted on said clamping member.

2. In eyeglasses or spectacles, the combination with the rim, of a clamp comprising clamping blocks embracing the rim, and a clamping screw engaging the blocks, a nose rest, and means for connecting the nose rest pivotally to one of the blocks.

3. In eyeglasses or spectacles, the combination with a rim, of opposed members whose contiguous faces are provided at one end with grooves to form a seat for the rim, and inwardly directed fingers to grip the latter, means for clamping said members together, and a nose-rest pivotally mounted upon said clamp.

4. In eyeglasses or spectacles, a rim, a two-part clamp embracing the same and having a seat therefor, tightening means for the clamp, a nose-rest, a member fixedly secured to one member of the clamp, and means on the nose-rest receiving said member and permitting of pivotal movement of the nose-rest.

In testimony whereof I have affixed my signature.

STEPHEN J. CLULEE.